United States Patent [19]

Conlon et al.

[11] Patent Number: 5,231,852

[45] Date of Patent: Aug. 3, 1993

[54] MELT SYSTEM FOR LIQUID PURIFICATION BY BATCH CRYSTALLIZATION

[75] Inventors: William M. Conlon, Palo Alto; Donald M. Hendricks, Woodside, both of Calif.

[73] Assignee: Polar Spring Corporation, Menlo Park, Calif.

[21] Appl. No.: 864,477

[22] Filed: Apr. 7, 1992

Related U.S. Application Data

[62] Division of Ser. No. 643,465, Jan. 18, 1991, Pat. No. 5,113,664.

[51] Int. Cl.$^5$ ............................................. B01D 9/04
[52] U.S. Cl. ........................................ 62/532; 62/125
[58] Field of Search ................. 62/123, 124, 532, 125, 62/129, 130

[56] References Cited

U.S. PATENT DOCUMENTS

| | | | |
|---|---|---|---|
| 3,338,065 | 8/1967 | Ashley | 62/123 |
| 4,799,945 | 1/1989 | Chang | 62/532 |
| 4,909,039 | 3/1990 | Yamada et al. | 62/125 |
| 4,954,151 | 6/1990 | Chang et al. | 62/532 |

*Primary Examiner*—William E. Tapoicai

[57] ABSTRACT

Ice formed in a batch crystallization apparatus is melted by causing an ice sheet 20 to be cut into approximately equal size pieces by the knife-edge 32 of melter 26. The pieces of ice are induced to slide against the sides of melter by inclined rails 28. Temperature sensor 40 and controller 44 are used to operate a heater to maintain the melter at a temperature setpoint 54 for a fixed time period while the ice sheet is cut into pieces. While the ice pieces melt the heating means is maintained fully on and the product drain valve is kept open. When the ice has melted the temperature exceeds the setpoint signaling the controller that the melting phase is complete. Failure of the apparatus to freeze ice is diagnosed by the temperature exceeding the setpoint at the end of said time period. Failure of the apparatus to melt ice is diagnosed by the temperature not reaching the setpoint after a sufficient amount of time.

3 Claims, 4 Drawing Sheets

MELT SYSTEM FOR LIQUID PURIFICATION BY BATCH CRYSTALLIZATION

This is a divisional application of pending application Ser. No. 07/643,465, filed Jan. 18, 1991 now U.S. Pat. No. 5,113,664.

BACKGROUND—FIELD OF THE INVENTION

The invention relates to improvements to liquid purification methods and means for partially freezing a liquid, then draining the unfrozen liquid portion, and finally melting the frozen portion in a single or multiple chamber batch system. More particularly, the invention relates to improvements to the melting phase of such systems.

BACKGROUND—DESCRIPTION OF PRIOR ART

A batch crystallization apparatus for liquid purification operates in a cycle consisting of the following phases repeated in sequence:
(a) fill a chamber with the liquid to be purified;
(b) remove heat from the chamber to form frozen liquid of the desired thickness;
(c) drain the unfrozen liquid containing the concentrated impurities from the chamber;
(d) melt the purified frozen liquid and drain it into a storage tank or vessel for use.

Because the solubility of impurities is much higher in the liquid phase than in the solid phase, the impurities become relatively concentrated in the unfrozen liquid and the ice sheet is relatively purified. The frozen liquid can be melted by electric heating, or by applying the heat removed from an opposing out-of-phase chamber.

In one embodiment of a batch crystallization water purification apparatus, liquid to be purified is placed in a freeze tray. A horizontal freeze plate is placed in intimate contact with the upper surface of the liquid and evaporating refrigerant is circulated through the coils of the freeze plate. An ice sheet is formed on the lower surface of the freeze plate and is grown downward into the liquid until the ice sheet reaches the desired thickness. The unfrozen liquid containing the concentrated impurities is drained from the freeze tray and then the purified ice sheet is melted and the melted purified liquid is drained from the freeze tray.

In a household appliance for drinking water purification, a single chamber might be used to reduce the first cost of the appliance and electric heating would be used to melt the ice. In such a case it is desirable that the ice be melted quickly in order to maximize the throughput of purified water, which suggests that the heater power be maximized, consistent with safety and reliability. At the same time, it is desirable to minimize the temperature of the melt water, both to conserve energy and because many consumers prefer drinking water that is cold. In addition, it is necessary to avoid excessive heat transfer from the electric heater to surrounding components such as purified water storage tanks or freeze trays, since such heat transfer reduces the overall throughput and efficiency of the apparatus.

Generally, the ice must be removed from the freeze plate before it can be melted. We have found that the ice sheet sticks to the freeze plate with a kind of adhesive bond and that the strength of this bond decays as the ice melts at the interface between the freeze plate and the ice sheet. When the adhesive strength becomes less than the weight of ice being supported the ice will fall of the plate. The time required for the ice to fall from the plate is thus dependent on a number of factors: the weight of ice being supported, the initial strength of the adhesive bond between the ice and the freeze plate, and the rate at which the adhesive bond weakens. Applying heat to the freeze plate speeds the decay of the adhesive bond by melting the ice at the interface faster than would occur from heat gain from the surroundings. It has been found that the use of an electric heater with a watt density of 0.06 watts per square centimeter of freeze plate area for several minutes is sufficient to release the ice sheet from the freeze plate. We have also found that for very thin ice layers, the ice will not fall of the plate in a reasonable period of time. Thus it is necessary for the ice to be grown to a critical weight, corresponding to an average ice thickness of about 2 millimeters.

Since the unfrozen liquid may not drain completely because of surface tension, some contamination of the melt water may occur when the ice sheet falls onto the surface of the freeze tray.

SUMMARY OF THE INVENTION

Accordingly, the present invention provides a means of rapidly and efficiently melting purified frozen liquid while simultaneously minimizing the contamination of the purified melted liquid with the impurity laden unfrozen liquid that may remain attached to the surface of the Freeze Tray.

An additional object of the invention is to provide a means of directing the frozen liquid against the heating means without the use of moving parts.

Another object is to provide a means for reducing the overall height of the batch crystallization apparatus.

Still another object is to provide a method of controlling the heating means during the melting phase and of determining the completion of the melting phase of a batch crystallization cycle.

Still another object is to provide a method of controlling the heating means during the melting phase that is independent of the time required for the ice to fall off the freeze plate.

Still another object is to provide a means minimizing sensible heat addition to the liquid.

Still another object is to afford more intimate contact between the heater and the purified ice.

Still another object is to provide a method of diagnosing fault conditions to the effect that the batch crystallization apparatus failed to freeze or melt ice.

DESCRIPTION OF THE PREFERRED EMBODIMENT

Figure 1:
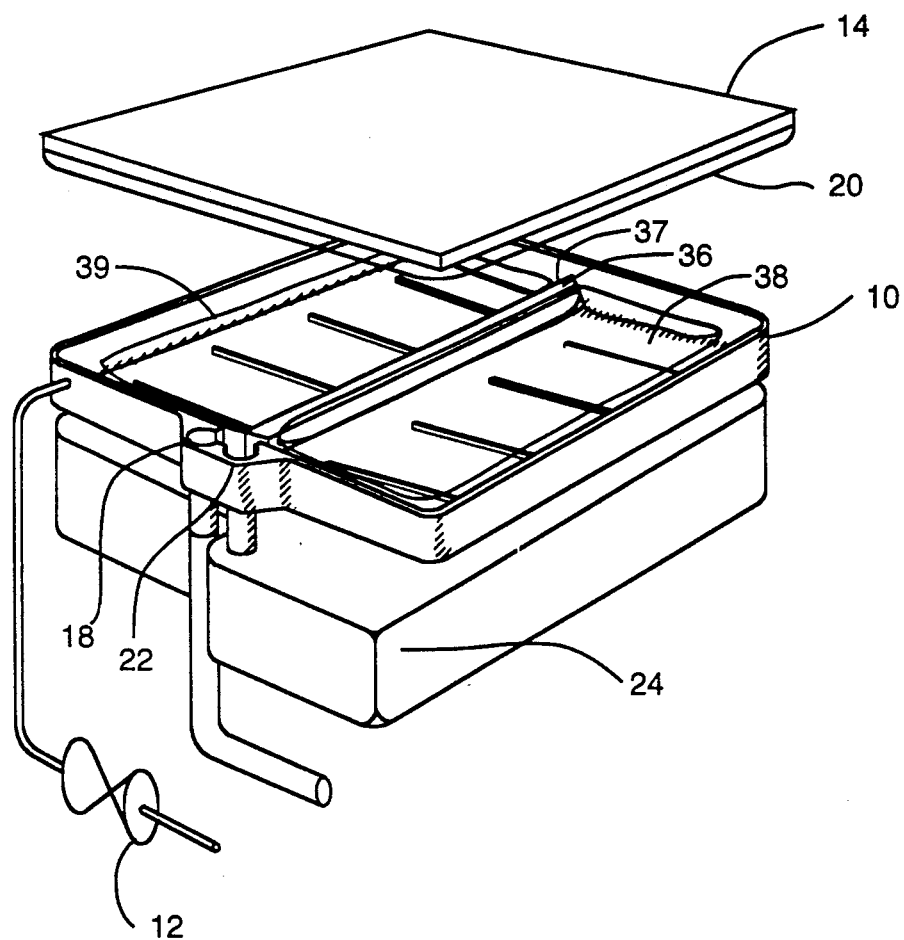
FIG. 1 shows an exploded view of a batch crystallization apparatus.

FIG. 1 shows an exploded view of an embodiment of a batch crystallization apparatus. Liquid to be purified is introduced into the freeze tray 10 via the inlet valve 12 until the liquid is in substantially complete contact with the lower surface of the freeze plate 14. The upper surface of the freeze plate 14 is cooled to a temperature below the freezing point of the liquid by suitable means, which may be conventional vapor compression refrigeration, circulation of a heat transfer fluid, thermoelectric (Peltier effect) devices, absorption chilling, or other means. Heat flows from the liquid through the freeze plate for a period of time sufficient to cause an ice sheet 20 of the desired thickness to form on the freeze plate. The ice sheet 20 is purified relative to the initial liquid and the liquid remaining below the ice sheet 20 is concentrated in the impurities contained in the initial liquid. The remaining impurity laden liquid is removed from the freeze tray 10 via the concentrate drain valve 18, leaving behind the purified fraction of the liquid in the form of ice and a small residue of impurity laden liquid which is attached via surface tension to the surface of the freeze tray 10 and to the surface of the ice sheet 20. To extract the purified fraction from the freeze tray 10 it is necessary to melt the ice sheet 20 and drain the melted liquid through the product drain valve 22 into the product storage tank 24. Also shown in FIG. 1 is the first piece of the ice sheet 38 resting on rails 28 and against the first side of the melter 36 and the second piece of the ice sheet 39 resting on rails 28 and against the second side of the melter 37.

Figure 2:
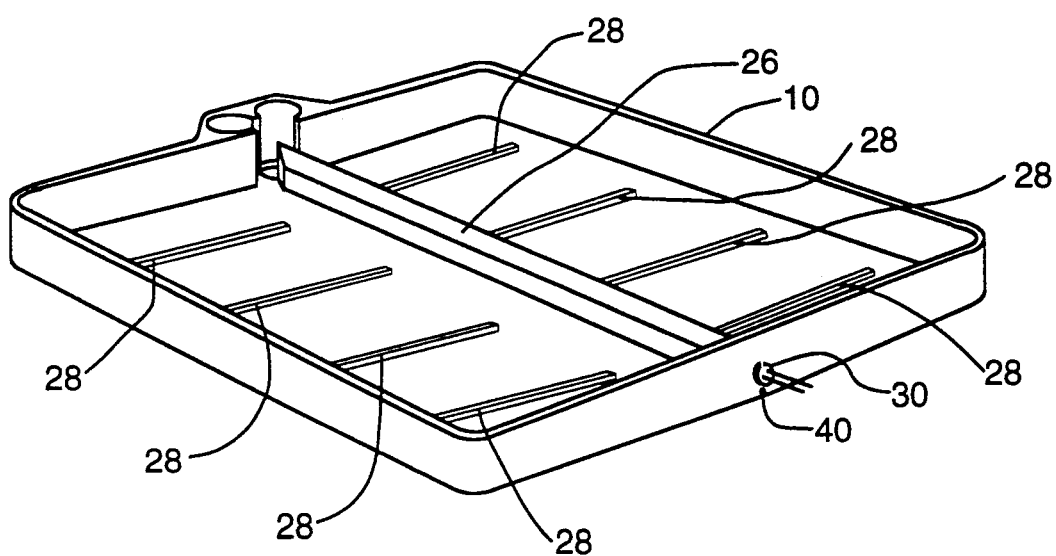
FIG. 2 shows a top perspective view of the melter and rails in the freeze tray.

FIG. 2 shows a top perspective view of the freeze tray 10 with the melter 26. In one embodiment, the freeze tray 10 is approximately 26.5 cm long by 26.5 cm wide by 2.5 cm deep, but the dimensions may be varied. The freeze tray 10 may be fabricated of any suitable material, including metals, plastics and ceramics, and the surface of the freeze tray 10 is preferably of a nonwetting nature to facilitate drainage of liquid. The melter 26 is disposed approximately along the centerline of the freeze tray 10 and extends to near but not in contact with the wall of the freeze tray 10 at which the drain valves are located. The surface of the freeze tray 10 is disposed at an angle to the horizontal, pitched toward the drain valves, and the surfaces of the freeze tray 10 on either side of the melter 26 is simultaneously disposed at an angle to the horizontal, pitched toward the product troughs 34. The angle of the surface of the freeze tray 10 will depend on the roughness and surface tension of the material or coating, but a pitch of about 1 degree is adequate for a smooth surface of polyvinylidene fluoride. Two or more inclined rails 28 are disposed on each side of the melter at a perpendicular to the centerline of the melter 26 and extend away from the melter 26 more than one-half the distance from the melter 26 to the wall of the freeze tray 10. The inclined rail 28 are disposed at an angle to the horizontal sufficient to overcome the static friction of ice on the rails, but an angle of 2 degrees is adequate for water ice on a smooth surface of polyvinylidene fluoride. The low point of the inclined rails 28 begins one to two cm away from the melter 26 to provide a product trough 34 along which liquid can flow to the drain valves. Because of heat gain around the periphery of the freeze tray 10, the ice sheet 20 is thicker in the center of the freeze tray 10 than around the edges. In the preferred embodiment, the innermost of the inclined rails 28 are vertically offset downward compared to the outermost of the inclined rails 28 to provide more vertical clearance for the ice sheet 20. In the embodiment shown, the inclined rails 28 are an integral part of the freeze tray 10, for example by being cast or molded into the freeze tray 10, but the inclined rails 28 may also be independent of the freeze tray 10. If the inclined rails 28 are integral to the freeze tray 10, it is advantageous to provide generous radii where the inclined rails 28 intersect with the lower surface of freeze tray 10 to minimize adhesion of impurity laden concentrated liquid at the intersections.

Figure 3:
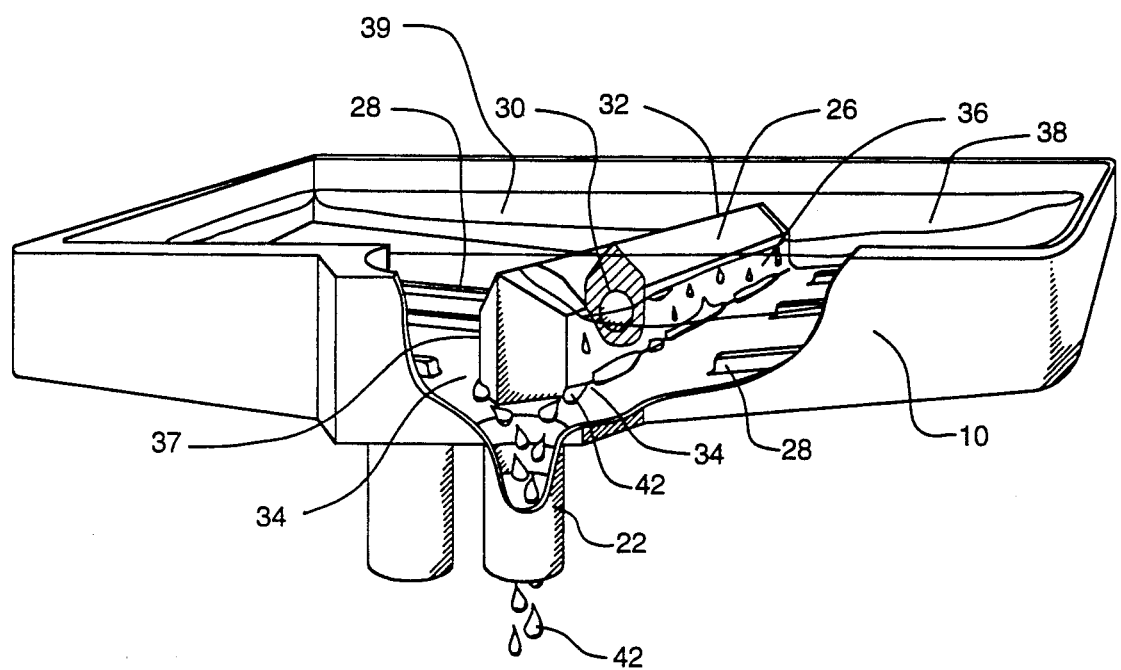
FIG. 3 shows a cut-away view through the apparatus showing the melter and rails.

FIG. 3 shows a cut-away view through the apparatus showing the melter 26 and inclined rails 28. The heating means 30, disposed longitudinally within the melter, may be an electric heater or other heat source, such as a heat transfer fluid or condensing refrigerant. In the preferred embodiment, the heating means is integrally cast or molded into the freeze tray 10 to provide intimate contact with the melter 26. Alternatively, the heating means 30 may be inserted into a hole drilled longitudinally within the melter 26 or may be inserted from the underside of the freeze tray 10 into a slot that has been molded, cast, or machined into the melter 26. The power of the heating means 30 will depend on the maximum temperatures permitted for the melt water and the heating means, but a heat flux of about 4 watts per square centimeter of melter area has been found to be adequate. In the embodiment shown in FIG. 3, the uppermost surface of the melter 26 is a knife-edge 32 which is oriented toward the ice sheet 20, said knife edge 32 being horizontal and located approximately halfway below the top of the freeze tray 10. In other embodiments, the cross-section of the melter have a smooth profiles. Product troughs 34 are at the lower edge of the melter 26. Purified water droplets 42 run down the melter 26, along the product trough 34 and through the product drain valve 22.

Figure 4:
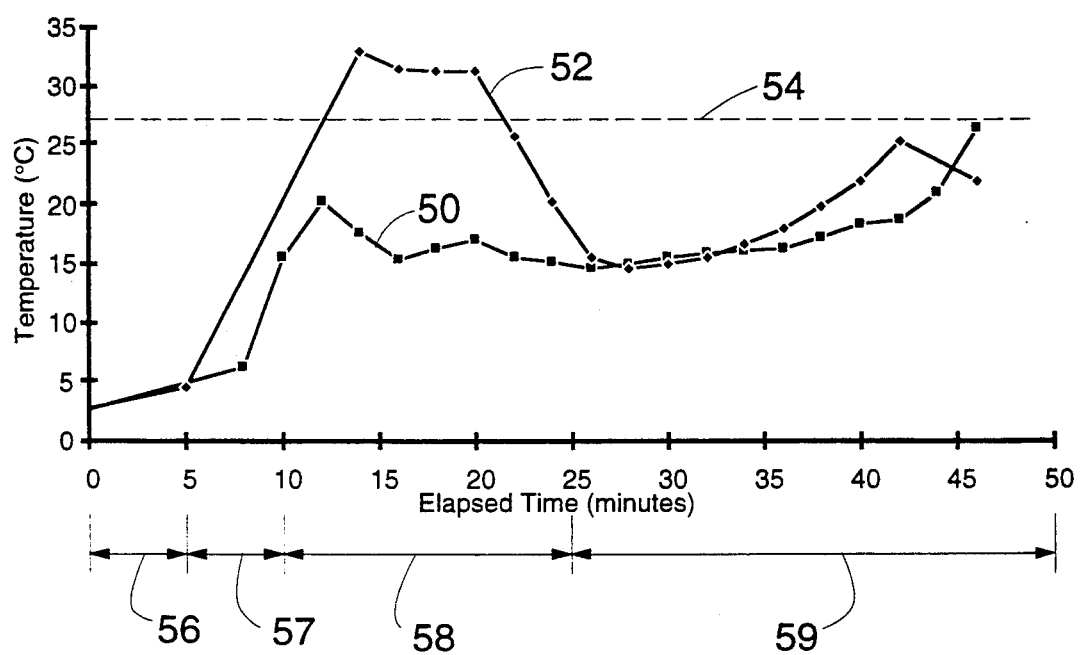
FIG. 4 shows actual curves of melter temperature as a function of time during the melting phase of a batch crystallization cycle.

FIG. 4 shows typical curves of temperature as a function of time during the melting phase of a batch crystallization cycle using an embodiment of the invention. Also depicted in FIG. 4 is a temperature setpoint 54 and four distinct periods of time, a first time period 56, a second time period 57, a third time period 58, and a fourth time period 59. Curve 50 shows a curve of temperature versus time for a quick-release ice sheet which detached quickly from the freeze plate 14, such as might be obtained by using a release heater. Under the influence of the heating means 30 the temperature sensor 40 indicated a trend of increasing temperature until a relative maximum temperature was obtained after about four minutes. The temperature then decreased as the ice sheet 20 was split into a first piece of the ice sheet 38 and a second piece of the ice sheet 39, and the temperature decreased to about 15° C. For approximately 15 to 20 minutes the temperature indicated by the temperature sensor 40 was approximately constant, after which time the temperature trend increased until the temperature reached the temperature setpoint 54 of about 30° C., and the heating means 30 was turned off. Curve 52 shows a curve of temperature versus time for a slow release ice sheet which detached slowly from the freeze plate 14, such as might be obtained without the use of a release heater. Under the influence of the heating means 30 the temperature sensor 40 shows a trend of increasing temperature until the temperature measured by the temperature sensor 40 reached the temperature setpoint 54 of about 30° C. after about six minutes. The temperature measured by the temperature sensor 40 was then maintained at the temperature setpoint 54 by the action of the controller 44. After about 15 minutes the ice sheet fell off the freeze plate 10 and the temperature measured by the temperature sensor 40 decreased as the ice sheet 20 was split into a first piece of the ice sheet 38 and a second piece of the ice sheet 39. Thereafter, the temperature stabilized at about 15° C. for approximately 10 minutes after which time the temperature began to increase again. When the temperature reached the temperature setpoint 54 of about 30° C., the heating means 30 was turned off.

OPERATION OF THE INVENTION—NORMAL OPERATION

After a suitably thick ice sheet 20 has been formed on the freeze plate 14 the cooling means are turned off or removed from the freeze plate 14 by controller 44 and the concentrate drain valve 18 is opened by controller 44. After a first time period 56, sufficient to allow substantially all of the impurity laden liquid to drain from the freeze tray 10, the heating means 30 is turned on or applied to the melter 26 by controller 44. It has been found to be advantageous to keep the concentrate drain valve 18 open during a second time period 57 to allow a few remaining drops of the impurity laden liquid to drain from the freeze tray 10, but the second time period 57 can be reduced to zero with only minor contamination of the purified water. At the conclusion of the second time period 57, the concentrate drain valve 18 is closed and the product drain valve 22 is opened. During both the second time period 57 and the subsequent third time period 58, the heating means are regulated by controller 44 to maintain the temperature measured by the temperature sensor 40 at or below the temperature setpoint 54 to prevent the melter 26 from experiencing excessively high temperatures while the ice sheet 20 is still attached to the freeze plate 14. At some point before the conclusion of the third time period 58, the ice sheet 20 comes to rest on the melter 26, is sliced into two portions, with a first piece of the ice sheet 38 and a second piece of the ice sheet 39 disposed along either side of the melter 26 and resting on the inclined rails 28 and against the first side of the melter 36 and the second side of the melter 37, respectively. As energy is supplied by the heating means 30 to the melter 26, the first piece of the ice sheet 38 melts against the first side of the melter 36 and the second piece of the ice sheet 39 melts against the second side of the melter 37. As the ice melts, purified water droplets 42 run down the melter 26 along the product troughs 34 and thence through the product drain valve 22 into the product storage tank 24. The inclined rails 28 support the pieces of ice above the surface of the freeze tray 10, thereby minimizing the contact with residual impurities or residual impurity laden water. The inclination of the rails 28 imparts a horizontal force to the pieces of the ice sheet 20 toward the melter 26. As the ice melts, both the first piece of the ice sheet 38 and the second piece of the ice sheet 39 slide along the inclined rails 28 until substantially all of the ice has been melted. At the conclusion of the third time period 58, the heating means 30 are turned on and remain turned on until the temperature measured by the temperature sensor 40 reaches the temperature setpoint 54, indicating that the ice sheet 20 is completely melted, and causing the controller 44 to turn off the heating means 30. The product drain valve 22 may be closed by the controller 44 coincident with turning off the heating means 30 or may remain open for an additional short period of time. It is advantageous to keep the product drain valve 22 open while ice is being melted to prevent purified water droplets 42 from accumulating in the freeze tray 10. Such an accumulation might decrease the melting efficiency by causing the temperature of the melted purified water droplets 42 to increase, might allow purified water to back up along the rails 28 and become contaminated with residual impurities, or might float the pieces of ice off the rails 28 and away from contact with the melter 26.

OPERATION OF THE INVENTION—FAULT DIAGNOSIS

The present invention permits the diagnosis of several fault or failure conditions that could occur in a batch crystallization apparatus. Normally, at the conclusion of the third time period 58, the ice sheet 20 has been split into two pieces that rest against either side of the melter 26 and the temperature measured by the temperature sensor 40 is less than the temperature setpoint 54. If at the conclusion of the third time period 58, the temperature measured by the temperature sensor 40 is not less than the temperature setpoint 54, the most likely explanation is that no ice was produced in the batch crystallization apparatus due to one or more of several possibilities:

(a) the cooling of the freeze plate 14 was inadequate;
(b) the liquid to be purified was not in contact with the freeze plate 14 due to a leak through the concentrate drain valve 18, the product drain valve 22, or the freeze tray 10 itself; or
(c) the liquid to be purified was not in contact with the freeze plate 14 caused by the liquid level probe 16 prematurely signaling that the freeze tray 10 was full of liquid.

Whatever the cause, the batch crystallization apparatus would most likely require service, and the controller 44 can readily sense this condition and alert the user that there is a problem.

Normally, the temperature measured by the temperature sensor 40 will reach the temperature setpoint 54 at some time between the conclusion of the third time period 58 and the conclusion of the fourth time period 59, thereby indicating to the controller 44 that the melting phase of the batch crystallization process is complete. If this temperature has not reached the temperature setpoint 54 by the conclusion of the fourth time period 59, it is likely that the heating means 30 has failed, and the controller 44 can readily sense this condition and alert the user that there is a problem.

Therefore the present invention will provide a means and method of efficiently melting the ice produced in a batch crystallization apparatus. The present invention minimizes the contact of the purified ice sheet with contaminant laden unfrozen liquid by supporting the ice sheet on rails. By inclining the rails toward the heating means, the present invention provides means for inducing the ice sheet to slide against the heating. Moreover, locating the heating means along the centerline of the freeze tray, the present invention permits the ice sheet to be cut into pieces so the required angle of inclined rails can be obtained with a smaller vertical rise, thereby permitting the use of larger freeze plates in a batch crystallization apparatus. Furthermore, the present invention minimizes the contact of melt water with unfrozen liquid droplets remaining on the surface of the freeze tray by restricting the melt water to troughs near the heating means. In addition, the present invention provides a method for determining the completion of the melting phase of the batch crystallization cycle and methods for identifying fault conditions in the apparatus related to the freezing and melting of ice.

We claim:

1. A method for determining that ice has been substantially completely melted comprising the steps of:

a. operating a heating means in a regulated mode to maintain the temperature of a melter below a setpoint for a predetermined time period sufficient to allow an ice sheet to split into two pieces, and
b. operating said heating means in a fully on mode until the temperature of said melter exceeds said setpoint.

2. A method for determining a fault condition in a batch crystallization apparatus comprising the steps of:
a. operating a heating means in a regulated mode to maintain the temperature of a melter below a setpoint for a predetermined time period sufficient to allow an ice sheet to split into two pieces, and
b. comparing the temperature of said melter to said setpoint at the conclusion of said predetermined time period, where the temperature exceeding said setpoint indicates a failure to produce ice.

3. A method for determining a fault condition in a batch crystallization apparatus comprising the steps of:
a. operating a heating means in a regulated mode to maintain the temperature of a melter below a setpoint for a predetermined time period sufficient to allow an ice sheet to split into two pieces, and
b. operating said heating means in a fully on mode until the temperature of said melter exceeds said setpoint, and;
c. comparing the temperature of said melter to said setpoint at the conclusion of a second predetermined time period sufficient to completely melt said ice sheet, where the temperature less than said setpoint indicates a failure of said heating means.

* * * * *